Patented July 24, 1951

2,561,729

UNITED STATES PATENT OFFICE 2,561,729

POLYMERIZATION OF ISOOLEFINS WITH COMPLEX FRIEDEL-CRAFTS METAL HALIDE CATALYSTS

Ralph W. Dornte, Westfield, N. J., assignor to Standard Oil Development Company, a corporation of Delaware No Drawing. Application November 14, 1946,
Serial No. 709,792

9 Claims. (Cl. 260—85.3)

This invention relates to the low temperature polymerization of olefins; relates particularly to means for the control of such low temperature polymerizations; and relates especially to the low temperature polymerizations of olefins by Friedel-Crafts catalyst substances in conjunction with catalyst control-means comprising ethylene compounds containing only saturated substituents.

It has been found possible to produce a series of very valuable polymers by the low temperature polymerization of olefinic materials such as mono-olefins and multi-olefins. An extremely valuable elastomer can be prepared from a major proportion of isobutylene with a minor proportion of a multi-olefin having from 4 to 14 carbon atoms per molecule, at temperatures between about $-40°$ C. and $-165°$ C., by application of a Friedel-Crafts catalyst, which material cures with sulfur and other substances to form a very valuable elastomer. Similarly, a very valuable resin can be prepared from a relatively large proportion of a multi-olefin with a substantial proportion of a normal mono-olefin having from 3 to 20 carbon atoms per molecule or an iso-olefin having from 5 to 20 carbon atoms per molecule, at temperatures between about $+15°$ C. and $-35°$ C. by the similar application of a Friedel-Crafts catalyst to yield a hard resin which is of great value as a paint or varnish coating, especially in conjunction with linseed oil. Similarly, another valuable polymer can be produced by the copolymerization of styrene with other mono-olefins and multi-olefins at temperatures ranging from $0°$ C. to $-165°$ C., also by the application of a Friedel-Crafts catalyst, which polymers likewise have many valuable properties.

In all of these polymerizations, however, the character of the polymer obtained is, to a large extent, controlled by the temperature of polymerization and the impurities present in the polymerizate mixture. It is highly desirable that means be available for determining the character of polymer independently of the composition of the polymerizate mixture and with a minimum of influence from the presence of impurities.

According to the present invention, it is now found that a very substantial and valuable measure of control of the polymerization reaction can be exercised by the use of a composite catalyst consisting of a Friedel-Crafts active metal halide substance in combination with an ethylenic group having thereon at least one substituent of a saturated character; that is, the polymerization is conducted by applying to the cold olefinic material a Friedel-Crafts active metal halide catalyst in conjunction with a substituted ethylene in which the substituent is an aromatic group, a halogen or an aliphatic group in basic character but may contain additional coupled components. Aliphatic substituents which yield tertiary olefins such as isobutylene are excluded from this complex forming function because of their ease of polymerization by Friedel-Crafts type catalysts. Other objects and details of the invention will be apparent from the following description:

The primary raw materials for the reaction of the present invention are found in the mono- and multi-olefins including any of the mono-olefins having from 3 to 20 carbon atoms and any of the multi-olefins having from 4 to 14 carbon atoms; as well as the aryl-substituted ethylenes including the phenyl and naphthyl ethylenes, and the like, which, for the purposes of this specification and invention, are defined as "olefins," in view of their clear character as substituted ethylenes.

For the making of an elastomer, the preferred mono-olefin is isobutylene, which, for most purposes, is preferably used in major proportion; that is, from 50% or 60% or 70% to 99% of the unsaturates in the polymerization mixture.

The second principal component of the raw material is the multi-olefin which may be any unsaturate (other than the aromatics) having more than one carbon to carbon double linkage and from 4 to 14 carbon atoms per molecule (which for the purposes of this application are defined as "multi-olefins" without regard to the presence in or on the hydrocarbon chain of non-hydrocarbon or hydrocarbon substituents), including such substances as butadiene, isoprene, piperylene, dimethyl butadiene, myrcene, alloocymene, dimethallyl, and the like, which, for the elastomer are preferably present in minor proportion, that is, from 40% or 30% to about 1%.

For the preparation of a resinous type material, the preferred primary materials are found in any of the normal mono-olefins having from 3 to 20 carbon atoms and any of the iso-olefins having from 5 to 20 carbon atoms inclusive. In combination with these mono-olefins there may then be used any of the multi-olefins above-listed having from 4 to 14 carbon atoms per molecule, the multi-olefin preferably being present in the proportion of 30 to 80%, with mono-olefins making up the remainder.

The polymerization reaction is conducted within a temperature range between about $+10°$ C. to about $-164°$ C. For the making of an elastomer, the preferred temperature range is from about −40° C. to about −100 to −103° C., and for the making of a hard resin, the temperature range preferably is between +10° C. and −35° C. or −40° C.

In either reaction the olefinic components may be polymerized in the absence of other substances, or may be polymerized in the presence of a suitable diluent. For such diluents, in the making of an elastomer, the preferred substances are ethyl or methyl chloride, methylene chloride, chloroform, ethylene chloride, and the various fluoro and fluoro-chloro-substituted compounds. For the purposes of this application, diluents of this type are defined as "alkyl halides" without regard to the number or character of the halogen substituents. In addition, a wide range of hydrocarbon substances is usable including such substances as propane, butane, pentane, and various of the light naphthas.

When the reaction mixture has been prepared and cooled to the desired temperature, it is polymerized by the application of the Friedel-Crafts active metal halide catalyst in conjunction with a substituted ethylene having an aromatic group, a halogen or an aliphatic group in basic character but may contain additional coupled components. Aliphatic substitutents which yield tertiary olefins such as isobutylene are excluded from this complex forming function because of their ease of polymerization by Friedel-Crafts type catalysts. The substituted ethylene may be present in an amount ranging from traces, that is 1/20 to 1/10 of a mol per mol of Friedel-Crafts active metal halide substance present, to amounts as great as 10 molar parts, or 10 mols per mol of active metal halide present.

Suitable substituted ethylenes are such substances as vinyl chloride, allyl chloride, alpha methyl beta chloro-styrene, or 1 methyl 1 phenyl 2-chloro ethylene, methallyl chloride, vinylidine chloride, trichloroethylene, tetrachloroethylene, styrene, nuclearly halogenated styrenes, tri and tetramethyl ethylene, 1,1 diphenyl ethylene, triphenyl ethylene, and the like.

For the Friedel-Crafts active metal halide catalyst, aluminum chloride usually is the preferred substance, but such substances as titanium tetrachloride and boron trifluoride are just about as useful; and in fact, any of the Friedel-Crafts catalysts disclosed by N. O. Calloway in his article on "The Friedel-Crafts synthesis" printed in the issue of "Chemical Reviews" published for the American Chemical Society at Baltimore in 1935, in volume XVII, No. 3, the article beginning on page 327, the list being particularly well shown on page 375, may be used.

This composite catalyst material may usually be prepared merely by mixing together the active metal halide and the substituted ethylene in the proper proportions in a non-complex-forming solvent. The resulting mixture usually is a liquid which sometimes may be used directly, but usually is preferably used in solution in a low-freezing, non-complex-forming solvent such as the diluents above-listed. For the purposes of this specification, the catalyst solvent is defined as low freezing when its freezing point is below 0° C., and is non-complex-forming when there does not separate from the solution on evaporation of the solvent a compound between the solvent and the Friedel-Crafts catalyst; or when the addition of the solvent in the form of a vapor to the catalyst at constant temperature will lead to a substantially continuous change in the composition of the catalyst solution phase and to a continuous increase in the partial pressure of the solvent.

The liquid catalyst composition may then be applied to the cold, rapidly stirred olefinic material in any convenient fashion, although the preferred method is in the form of a fine, high pressure jet into the body of the cold olefinic material. Alternatively, in some instances, the catalyst may be applied in the form of a fine spray onto the surface of the cold olefinic material.

The reaction proceeds promptly to yield the desired polymer, which, if an elastomer, is a white, rubber-like material having a molecular weight within the range between 20,000 and about 80,000, although by appropriate methods, molecular weights as high as 150,000 (as determined by the Staudinger method) may be obtained. The polymerfis characterized by an iodine number (by the Wijs method) ranging from about 0.5 to 50, although the preferred iodine number lies between about 1 and 10. Alternatively, the unsaturation may be measured in terms of molecular unsaturation, which is defined as the percentage of multi-olefinic molecules to mono-olefinic molecules copolymerized; since each multi-olefin brings into the final molecule one (or more, if tri-olefins or higher are used) unit of unsaturation, whereas the unsaturation disappears from all but the last of the monoolefinic molecules interpolymerized.

This polymer is reactive with sulfur in a curing reaction which has some points of similarity to natural rubber in that the property of cold flow disappears and the material acquires a definite tensile strength and definite elongation at break. The curing reaction may be obtained with sulfur alone, although the time and temperature required are undesirably high and high enough to cause a troublesome depolymerization of the polymer. Preferred curing methods utilize either sulfur with a thiuram type of sulfurization aid such as Tuads (tetra methyl thiuram disulfide) or perhaps better, the curing reaction is obtained by the use of a small amount, from 0.01% to 10%, of a quinone dioxime or its homologues or analogues, such substances as para quinone dioxime itself being particularly suitable as are various of the esters. Alternatively, and for the most rapid cure, the dinitroso compounds are particularly effective and suitable; such substances as dinitroso benzene, dinitroso naphthalene, dinitroso cymene, and the like being particularly efficient and useful. The curing operation is preferably conducted upon a polymer which contains from 1 to 10% of stearic acid; from 1 to 10% of zinc oxide, and a substantial amount of carbon black which may range from 10% to 200% (on the weight of polymer present) in addition to the curing agent. The resulting cured polymer may show a tensile strength ranging from 1800 to 4000 pounds per square inch and an elongation at break ranging from 200 to 1200%, depending upon the condition of cure and the amount of pigments compounded into the mix. In addition, the polymer may show a modulus (that it, pounds pull per square inch required to elongate a sample by 300%) ranging from 200 to 500, again depending upon the amount and character of compounding agents and the state of cure.

If a hard resin is produced, the material tends to be slightly colored, ranging from a faintly yellow material to a medium brown, the color apparently being caused in part by extremely small traces of iron compounds. The hard resin may show a molecular weight ranging from 500 to about 50,000 (by the Staudinger method) and an iodine number (by the Wijs method) ranging from about 75 or 100 up to about 250, depending upon the relative proportions of mono-olefin and multiolefin. The resin shows a melting point (by the ball and ring method) ranging from about 75° C. to about 140° C. The resin so produced is a hydrocarbon which is readily soluble in hydrocarbons generally and also is readily soluble in the various paint oils and solvents and the various drying oils such as linseed oil, tung oil, dehydrated castor oil, oiticica oil, soybean oil and the like. The polymer either alone or in solution in such oils, is susceptible to a highly advantageous heat-bodying or auxiliary polymerization reaction, making this polymer particularly valuable for a paint or varnish resin.

These polymers and various other low temperature polymers are particularly advantageously obtained by the catalyst and process of the present invention.

EXAMPLE 1

A catalyst was prepared by mixing together two molecular weights of aluminum chloride $AlCl_3$ or one molecular weight of $Al_2Cl_6$ (if aluminum chloride is regarded as a complex molecule) with two molecular weights of vinyl chloride $C_2H_3Cl$. The catalyst was prepared merely by mixing together the aluminum chloride and the vinyl chloride in methyl chloride solution and the complex was then diluted with methyl chloride to yield the concentration indicated in column 3 in Table 1. The polymerizations were all conducted at a temperature close to the boiling point of liquid ethylene, between about −99° C. and −102° C. The various polymerizate feed stocks are indicated in the table in which B–0 indicates pure isobutylene, B–3 indicates a mixture of 97% isobutylene and 3% isoprene, B–8 indicates 92% isobutylene and 8% isoprene; A–10 indicates 90% isobutylene and 10% butadiene; S–60 indicates 40% isobutylene, 60% styrene, and S–100 indicates styrene alone.

Table 1
POLYMERIZATION BY THE COMPLEX CATALYST $Al_2Cl_6 \cdot 2C_2H_3Cl$ AT −102° C.

| Exp. No. | Feed | Catalyst Soln. Conc. g. $AlCl_3$/100 cc. | Conv. Weight Per Cent | Cat. Eff. g. polymer/ g. $AlCl_3$ | Unsat. I Cl Mol Per Cent | Int. Vis. | Mol. Weight×10⁻³ Staud. | Viscosity Average |
|---|---|---|---|---|---|---|---|---|
| 2-1 | B-0 | 0.26 | 51 | 400 | | 2.95 | 93 | 1420 |
| 2-1 | B-0 | .13 | 58 | 670 | | 3.20 | 100 | 1600 |
| 6-7 | B-0 (control) | .20 | 34 | 560 | | 4.10 | 130 | 2400 |
| 2-3 | B-3 | .26 | 53 | 530 | 1.71 | 1.25 | 39 | 375 |
| 2-2 | B-3 | .26 | 79 | 390 | 1.15 | 1.11 | 35 | 310 |
| 2-14 | B-3 | .13 | 85 | 420 | 2.05 | 0.98 | 31 | 255 |
| 6-4 | B-3 (control) | .20 | 31 | 350 | 1.49 | 1.62 | 51 | 570 |
| 2-16 | B-3 (non-diluent) | .13 | 9 | 680 | 2.44 | Insoluble | | |
| 2-7 | B-3 (non-diluent) | .26 | 14 | 780 | 2.53 | 1.43 | 45 | 460 |
| 6-1 | B-3 (non-diluent) (control) | .20 | 16 | 1580 | 2.45 | 1.43 | 45 | 460 |
| 2-17 | B-3 1:1 $C_4H_{10}$ | .13 | 29 | 550 | 2.16 | .99 | 32 | 260 |
| 2-8 | B-3 1:1 $C_4H_{10}$ | .26 | 39 | 440 | 2.26 | .93 | 29 | 235 |
| 6-2 | B-3 1:1 $C_4H_{10}$ (control) | .20 | 35 | 700 | 1.69 | 2.05 | 64 | 810 |
| 2-5 | B-8 | .26 | 52 | 280 | 3.98 | .93 | 29 | 235 |
| 2-15 | B-8 | .13 | 76 | 340 | 4.58 | .74 | 23 | 165 |
| 2-6 | B-8 | .26 | 80 | 320 | 4.05 | .83 | 26 | 195 |
| 6-5 | B-8 (control) | .26 | 73 | 320 | 3.74 | .87 | 27 | 215 |
| 2-4 | A-10 | .25 | 75 | 340 | 2.58 | 1.85 | 58 | 890 |
| 6-6 | A-10 (control) | .20 | 89 | 460 | 0.42 | 1.90 | 60 | 720 |
| 2-9 | S-60 | .26 | 100 | 310 | | 0.77 | | |
| 6-3 | S-60 (control) | .20 | 100 | 670 | | .71 | | |
| 2-10 | S-100 | .26 | 100 | | | .63 | | |

All feeds contain 3 volumes of methyl chloride per volume of unsaturates, unless specified.

| Exp. No. | Mooney Vis., 100° C., 8 min. | Parts Carbon Black | Tensile, 300% Modulus, Elongation, Cures at 307° F. | | | |
|---|---|---|---|---|---|---|
| | | | 20' | 40' | 60' | 80' |
| 2-3 | 46 | 50 | 3000- 520- 800 | 3000- 830- 650 | 3000-1070- 600 | 2900-1130- 800 |
| | | 10 | 3400 800 | 3300 700 | 3100 650 | 2800 600 |
| 2-2 | 36 | 50 | 2800- 460- 850 | 2900- 710- 750 | 3000- 830- 700 | 3000- 930- 700 |
| | | 10 | 3100 900 | 2900 850 | | |
| 2-14 | 29 | 50 | 2600- 450- 850 | 2900- 700- 750 | 2800- 800- 700 | 2900- 870- 700 |
| | | 10 | 2700 950 | 2600 750 | | |
| 6-4 | 79 | 50 | 3200- 530- 800 | 5300- 690- 700 | 3300- 790- 650 | 3300- 890- 650 |
| 2-16 | 82 | 50 | 3100- 920- 700 | 3100-1260- 600 | | |
| | | 10 | 2300 700 | 700 450 | 600 400 | 700 500 |
| 2-7 | 70 | 50 | 2900-1070- 650 | 2700-1410- 500 | 2700-1550- 450 | 2700-1780- 500 |
| | | 10 | 2200 700 | 800 500 | 700 400 | 900 450 |
| 6-1 | 85 | 50 | 3000- 400- 850 | 3200- 640- 750 | 3200- 800- 700 | 3200- 900- 650 |
| | | 10 | 3700 800 | 3600 700 | 3100 700 | 3100 600 |
| 2-17 | 32 | 50 | 2600- 460- 850 | 2700- 650- 750 | 2900- 850- 750 | 2900- 930- 700 |
| | | 10 | 2600 850 | 2900 750 | 2800 600 | 1800 600 |
| 2-8 | 23 | 50 | 2300- 450- 900 | 2600- 540- 800 | 2600- 780- 700 | 2700- 860- 650 |
| | | 10 | 2300 900 | 2100 750 | | |
| 6-2 | 78 | 50 | 3100- 690- 800 | 3100- 990- 650 | 3000-1100- 600 | 2900-1110- 600 |
| | | 10 | 2900 750 | 1200 550 | 800 400 | 800 400 |
| 2-5 | 25 | 50 | 2500- 970- 850 | 2600-1420- 500 | 2500-1550- 400 | 2400-1640- 400 |
| | | 10 | 1000 450 | 1000 340 | 800 350 | 900 300 |
| 2-15 | 14 | 50 | 2300- 920- 850 | 2300-1420- 450 | 2300-1600- 400 | 2300-1610- 400 |
| | | 10 | 1000 950 | 900 350 | | |
| 2-6 | 20 | 50 | 2400-1050- 600 | 2300-1600- 400 | 2300-1760- 400 | 2300-1810- 350 |
| | | 10 | 1100 600 | 700 400 | | |
| 6-5 | 29 | 50 | 2600-1050- 600 | 2500-1460- 450 | 2500-1700- 400 | 2400-1730- 400 |
| 2-4 | 75 | 50 | 1100- 120-1100 | 1900- 110-1100 | 1300- 120-1000 | 2000- 180-1100 |
| | | 10 | 200 1100 | 400 1100 | | |
| 6-6 | 68 | 50 | 700- 150- 850 | 1400- 180- 900 | 1500- 230- 850 | 2000- 260- 800 |

EXAMPLE 2

A catalyst for polymerizing hydrocarbons, particularly for the low temperature copolymerization of an iso-olefin such as isobutylene with a diolefin such as isoprene or the copolymerization of isobutylene and styrene or a styrene derivative, was prepared by the addition of styrene or 1,1 diphenyl ethylene as examples of aryl-substituted ethylenes to a solution of a Friedel-Crafts reagent such as aluminum chloride in methyl chloride. The styrene dissolved in the aluminum chloride solution was polymerized appreciably but a deep yellow or reddish brown solution was formed, indicating the presence of complexes of styrene or polystyrene with aluminum chloride. The 1,1 diphenyl ethene upon addition to aluminum chloride solutions gave an intense red color, indicating the formation of complex addition compounds which did not polymerize, however, since the diphenyl ethylene could be recovered nearly quantitatively from the catalyst solution. These catalyst solutions containing the complex compound, the aryl olefin and free aluminum chloride in concentrations dependent upon: (1) the mol ratio of aryl ethylene to aluminum chloride, (2) the temperature, (3) solvent, and (4) the specific dissociation equilibrium of the complex, were satisfactory catalysts for the polymerization of isobutylene and isoprene or of isobutylene and styrene. Other olefins or diolefins were also polymerized by these catalysts, a few were ethylene, propylene, and butylenes or butadiene, isoprene, and piperylene. Combinations of the above olefins and diolefins were copolymerized with each other or other monomeric vinyl derivatives to produce oils or high molecular weight materials.

An important effect obtained with the aryl ethylene Friedel-Crafts complex catalysts was marked reduction in the induction period which precedes the active polymerization. This effect was important in control of the reaction. The products obtained were improved in that the molecular weights and composition were more uniform at all conversions. The importance of homogeneity in copolymers with respect to molecular weight is reflected in the ease of processing or compounding of a high molecular weight product. Extremely high molecular weight products—evidenced by a high Mooney viscosity—requires special breakdown or molecular degradation prior to compounding. The aryl ethylene-aluminum chloride complex catalysts provided a means of controlling the molecular weight and compositional homogeneity of a copolymer.

EXAMPLE 3

A similar series of polymerizations were conducted using a complex of aluminum chloride with styrene; styrene being phenyl ethylene, or ethylene in which one hydrogen has been replaced by a phenyl substituent. The results of this series of polymerizations are shown in the following Table II.

*Table II*

POLYMERIZATIONS BY COMPLEXES OF ALUMINUM CHLORIDE AND STYRENE AT $-102°$ C.

| Exp. No. | Feed 3:1 | $C_6H_5CH-CH_2/$ AlCl$_3$ Mol Ratio | Conv. Weight Per Cent | Cat. Eff., g. polymer/g. AlCl$_3$ | Low Polymer, Weight Per Cent | Unsat. Mol Per Cent ICl | Int. Vis. | Mol Wt. $\times 10^{-3}$ | |
|---|---|---|---|---|---|---|---|---|---|
| | | | | | | | | Staud. | Viscosity Average |
| 3-5 | B-3 | 1 | 58 | 470 | 45.2 | 1.68 | 1.62 | 51 | 560 |
| 3-4 | B-3 | 1 | 71 | 480 | ------ | 1.78 | 1.52 | 48 | 510 |
| 3-3 | B-3 | 1 | 86 | 350 | 22.5 | 1.88 | 1.42 | 45 | 460 |
| 3-6 | B-3 | Control | 59 | 500 | 11.7 | 1.82 | 1.95 | 61 | 750 |
| 3-7 | B-8 | 1 | 57 | 270 | 26.4 | 4.51 | 1.18 | 37 | 340 |
| 3-8 | B-8 | Control | 58 | 290 | 19.9 | 4.15 | 1.18 | 37 | 340 |
| 3-1 | S-60 | 1 | 100 | 280 | ------ | ------ | .88 | ------ | ------ |
| 3-2 | S-60 | 1 | 100 | 320 | ------ | ------ | .91 | ------ | ------ |
| 1-12 | S-60 | Control | 100 | 480 | ------ | ------ | .92 | (60.2% | Styrene) |
| 3-10 | B-3 | 5 | 54 | 200 | 31.4 | 1.54 | 1.90 | 59 | 720 |
| 3-11 | B-3 | 5 | 80 | 160 | 33.2 | 1.65 | 1.62 | 51 | 560 |
| 3-12 | B-8 | 5 | 56 | 150 | ------ | 3.92 | 1.01 | 32 | 270 |
| 2-9 | S-60 | 5 | 100 | 220 | ------ | ------ | 1.06 | ------ | ------ |

Catalyst Solution, 0.20 g. AlCl$_3$/100 cc. CH$_3$Cl.
All feeds contain 3 volumes of methyl chloride per volume of unsaturates.

| Exp. No. | Mooney Viscosity @ 212° F. | Parts Carbon Black | Tensile, 300% Modulus, Elongation, Cures at 307° F. | | | |
|---|---|---|---|---|---|---|
| | | | 20' | 40' | 80' | 120' |
| 3-5 | 85 | 50 | 2900-400-750 | 2900- 680-700 | 2900- 940-600 | 2900-1040-550 |
| | | 10 | 4100  900 | 3700  800 | 3200  700 | |
| 3-4 | 65 | 50 | 3200-230-850 | 3300- 420-750 | 3100- 620-650 | 3000- 680-600 |
| | | 10 | 3400  800 | ------ | 1800  550 | |
| 3-3 | ------ | 50 | 3000-360-850 | 2900- 580-700 | 2900- 870-650 | 2900- 980-600 |
| | | 10 | 3500  850 | ------ | 2600  650 | |
| 3-6 | 86 | 50 | 3300-290-800 | 3100- 480-700 | 3000- 700-600 | 3000- 820-600 |
| | | 10 | 4100  800 | 3600  700 | 3000  650 | |
| 3-7 | 49 | 50 | 2700-750-650 | 2400-1210-500 | | |
| | | 10 | 800  500 | ------ | 500  400 | |
| 3-8 | 60 | 50 | 2700-710-650 | 2400-1040-500 | 2200-1340-400 | 2100-1450-400 |
| | | 10 | 1000  400 | 700  300 | 800  400 | |
| 3-1 | | | | | | |
| 3-2 | | | | | | |
| 1-12 | | | | | | |
| 3-10 | 65 | 50 | 2900-500-750 | 2800- 700-600 | 2900- 970-600 | 2800-1100-550 |
| | | 10 | 4200  850 | 3700  750 | 3600  700 | |
| 3-11 | 85 | 50 | 3000-400-800 | 3000- 580-700 | 2800- 760-600 | 2900- 900-600 |
| | | 10 | 3300  800 | ------ | 1600  550 | |
| 3-12 | 51 | 50 | 2400-860-600 | 2300-1320-400 | 2100-1780-350 | 2200-1880-350 |
| | | 10 | 1000  450 | 800  350 | 700  300 | |
| 2-9 | | | | | | |

EXAMPLE 4

Polymerizations of isobutylene and isoprene at $-102°$ C. by an aryl-substituted ethylene complex catalyst are shown in Table III. In all of these experiments the feed consisted of: 220 g. isobutylene, 6.6 g. isoprene and 1150 g. methyl chloride. The catalyst solution contained .2 g. $AlCl_3$/100 cc. $CH_3Cl$ for the controls and for the complex catalysts sufficient 1,1 diphenyl ethylene was added to give the indicated mol ratios of olefin to aluminum chloride. The catalyst solutions were sprayed into the agitated reactants at $-102°$ at the rate of 25-30 cc./min.

constant for the conversion range 58–86%. The unsaturation values over this conversion range also showed less variation (1.68–1.88 mol %) than the control polymers. The vulcanizate properties of the copolymers prepared with the styrene complex catalyst were equivalent to the properties obtained with aluminum chloride. The copolymers prepared with $C_8H_8/AlCl_3=5$ were also more uniform than the controls for the conversion range 54–80% in the following range of properties: unsaturation (1.54–1.65 mol %), molecular weight (59,000–51,000 Staudinger) and a constant Mooney viscosity (65). These are important

Table III
POLYMERIZATIONS BY COMPLEXES OF ALUMINUM CHLORIDE AND 1.1 DIPHENYL ETHYLENE AT $-102°$ C.

| Exp. No. | Feed | $(C_6H_5)_2C=CH_2/AlCl_3$ Mol Ratio | Conv. Weight Per Cent | Cat. Eff., g. Polymer/g. $AlCl_3$ | Low Polymer, Weight Per Cent | Unsat. Mol Per Cent ICl | Int. Vis. | Mol Wt.×10⁻³ Staud. | Mol Wt.×10⁻³ Viscosity Average |
|---|---|---|---|---|---|---|---|---|---|
| 2-5 | B-3 | 1.0 | 17 | 270 | 15.3 | 1.62 | 1.28 | 40 | 390 |
| 2-4 | B-3 | 1.0 | 63 | 690 | 13.5 | 1.71 | 1.35 | 43 | 420 |
| 2-6 | B-3 | 1.0 | 63 | 960 | 13.0 | 1.57 | 1.30 | 41 | 400 |
| 2-3 | B-3 | 1.0 | 85 | 410 | 18.3 | 2.16 | 1.21 | 38 | 355 |
| 2-7 | B-8 | 1.0 | 74 | 240 | | 4.30 | .84 | 26 | 200 |
| 2-8 | B-8 | 1.0 | 91 | 390 | 42.2 | 5.10 | .79 | 25 | 185 |
| 3-8 | B-8 | Control | 58 | 290 | 19.9 | 4.15 | 1.18 | 37 | 340 |
| 3-2 | S-60 | 1.0 | 88 | 280 | | | .78 | (62.0% Styrene) | |
| 3-10 | B-0 | 4.4 | 32 | 110 | | | 2.30 | 73 | 970 |
| 3-9 | B-3 | 4.4 | 21 | 50 | | 2.21 | .92 | 29 | 235 |
| 1-11 | B-3 | Control | 81 | | 22.3 | 1.87 | 1.35 | 43 | 420 |

Catalyst Solution, 0.19 g. $AlCl_3$/100 cc. $CH_3Cl$.

| Exp. No. | Mooney Viscosity @ 212° F. | Parts Carbon Black | Tensile, 300% Modulus, Elongation, Cured @ 307° F. 20' | 40' | 80' | 120' |
|---|---|---|---|---|---|---|
| 2-5 | | 50 | 2400–420–800 | 3000– 570–700 | 2400– 850–650 | 3000– 970–550 |
| | | 10 | 2700    950 | 2700    900 | 3700    750 | 2700    750 |
| 2-4 | 63 | 50 | 2900–310–800 | 3000– 470–750 | 3000– 710–650 | 2900– 850–650 |
| | | 10 | 3100    800 | 4100    700 | 3700    700 | 3600    700 |
| 2-6 | 62 | 50 | 2900–380–800 | 2600– 570–600 | 2600– 800–600 | 2700– 960–600 |
| | | 10 | 4100    800 | 3900    750 | 3100    650 | 3100    600 |
| 2-3 | 45 | 50 | 2700–360–800 | 2800– 610–700 | 2700– 870–600 | 2600– 990–600 |
| | | 10 | 2800    800 | 3300    700 | 2600    600 | 2500    550 |
| 2-7 | 29 | 50 | 2500–800–650 | 2200–1290–450 | 2000–1690–350 | 2200–1760–350 |
| | | 10 | 700    450 | | 600    350 | |
| 2-8 | 18 | 50 | 2200–780–600 | 1800–1280–400 | 1800–1620–300 | 1700–1700–300 |
| | | 10 | 800    500 | 700    400 | 700    400 | |
| 3-8 | 60 | 50 | 2700–710–650 | 2400–1040–500 | 2200–1340–400 | 2100–1450–400 |
| | | 10 | 1000    400 | 700    300 | 800    400 | |
| 3-2 | | | | | | |
| 3-10 | | | | | | |
| 3-9 | | 10 | 2100    950 | 2800    900 | 2700    800 | |
| 1-11 | 45 | 50 | 2700–330–850 | 2700– 490–750 | 2800– 700–700 | 2800– 820–650 |
| | | 10 | 3200    850 | 2900    750 | 2900    650 | 2800    600 |

The content of low molecular weight components is the weight per cent whose Staudinger molecular weight is less than about 20,000. The vulcanizations were carried out at 307° C. with the following compounds:

Table IV

| | 50 Parts Carbon Black | 10 Parts Carbon Black |
|---|---|---|
| Polymer | 100 | 100 |
| Zinc Oxide | 5 | 5 |
| Stearic Acid | 3 | 3 |
| Tuads | 1 | 1 |
| Captax | 0.5 | 1 |
| Cabot #9 Carbon Black | 50 | 10 |
| Sulfur | 2 | 1.5 |

The polymerizations with $C_8H_8/AlCl_3=1$ had catalyst efficiencies equal to the controls (350–480 g. polymer/g. $AlCl_3$). The percentages of low molecular weight components were higher with this complex catalyst than with $AlCl_3$: this effect was reflected in the average molecular weights (45,000–51,000 Staudinger) which were nearly novel properties obtained with the styrene-aluminum chloride complex catalysts which are not obtainable with the Friedel-Crafts-type catalyst alone.

EXAMPLE 5

In the copolymerization of styrene and isobutylene, for example, by the ordinary Friedel-Crafts-type catalyst at low temperature, the copolymer at low conversions contains very little styrene and the copolymer composition only approaches that of the feed at conversions near 100%. This result indicates heterogeneity in the final copolymer composition. These complex catalysts favor the copolymerization of styrene so that there is less difference between feed and copolymer compositions at all conversions.

An example of improved molecular weight obtained with the styrene complex was found where 120 g. styrene, 80 g. isobutylene, diluted with 850 g. methyl chloride were polymerized at $-102°$ C. with a complex styrene catalyst (0.20 g. $AlCl_3$/100 cc. $CH_3Cl$ with a $C_8H_8/AlCl_3$ mol ratio of five). The copolymer at 100% conversion had an intrinsic viscosity of 1.06; whereas a preparation with aluminum chloride alone had an intrinsic viscosity of .83 under the same conditions.

In another example the same feed composition was polymerized under the same conditions with a catalyst solution containing 1,1 diphenyl ethylene at a $C_{14}H_{12}/AlCl_3$ mol ratio of 1 and an aluminum chloride concentration of .2 g./100 cc. $CH_3Cl$. This feed and catalyst yielded a polymer containing 62.0% styrene at a conversion of 88% whereas an aluminum chloride catalyst gave a polymer containing only 55–57% styrene at the same conversion. This experiment shows that the aryl-ethylene complex catalyst of a Friedel-Crafts-type reagent facilitates the copolymerization of styrene and improves the compositional homogeneity of the copolymer.

EXAMPLE 6

An example of specific catalytic activity obtained with 1,1 methyl phenyl-2-chloroethene, illustrating aryl, alkyl and halogen-substituted ethylene with a Friedel-Crafts type catalyst-aluminum chloride, was obtained in which a green complex catalyst was prepared by dissolving 2.075 g. of

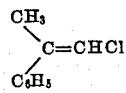

(0.0137 mol) in 304 cc. of $CH_3Cl$ containing sufficient $AlCl_3$ (approximately 0.6 g. $AlCl_3$/100 cc. $CH_3Cl$) to give a $C_9H_9Cl/AlCl_3$ mol ratio of 1. This solution was a very reactive catalyst for the polymerization of isobutylene, styrene and isoprene. At a dilution equivalent to 0.2 g. $AlCl_3$/100 cc. $CH_3Cl$, this green catalyst solution polymerized the following monomers at −78° C., when the monomers were dissolved in an equal volume of $CH_3Cl$: isobutylene, styrene, isoprene and methyl pentadiene. The unusual result here was the formation of a soluble polyisoprene which is not obtained with Friedel-Crafts catalysts alone. The dilute catalyst solution was evaporated to dryness and residual solid complex compound was redissolved in methyl chloride without loss of its catalytic activity.

EXAMPLE 7

Complex catalysts involving Friedel-Crafts reagents with halogen and halogen-alkyl-substituted ethylenes were obtained in experiments where aluminum chloride with either vinyl or allyl chlorides were employed. These compounds are examples of halogenated ethylene as complex-forming material. The complex of vinyl chloride was prepared by dissolving 10 cc. of vinyl chloride in 250 cc. of methyl chloride containing a total of 2.2 g. of aluminum chloride. This solution was slightly yellow in color but yielded a red solid complex compound on evaporation to dryness at 40–50° C. The solid isolated complex was readily soluble in methyl chloride and the solution was diluted to an equivalent of 0.2 g. $AlCl_3$/100 cc. $CH_3Cl$ for polymerization experiments. This complex compound, $Al_2Cl_6.xC_2H_3Cl$, was a very active catalyst for the polymerization of isobutylene, and styrene, but was not very effective for polymerization of isoprene. The excess vinyl chloride over that combined chemically in the complex compound was evaporated when the solution was taken to dryness. The allyl chloride complex was prepared in methyl chloride solution by adding equimolar quantities of the two chlorides which formed a yellow solution. This complex solution, with an allyl chloride-aluminum chloride mol ratio of one and at a concentration equivalent to 0.12 g. $AlCl_3$/100 cc. $CH_3Cl$, was very active catalyst for the polymerization of isobutylene, styrene and isoprene. The isoprene initially formed was soluble but when the polymerization reaction was allowed to proceed for about 5 minutes at −30° C., the entire solution gelled. This complex allyl chloride-aluminum chloride solution was evaporated to dryness and heated to 50° C. which removed any free allyl chloride. The residue, a red powder, dissolved in methyl chloride giving a red solution having the same catalytic properties as the original solution.

EXAMPLE 8

The aryl, alkyl and halogen-substituted ethylenes, any substituent singly or in conjunction with the others, form complex compounds with other Friedel-Crafts reagents, the catalytic properties of which will depend upon the specific Friedel-Crafts catalyst and the specific substituted ethylene selected for a specific polymerization reaction. The complex of α methyl-β-chlorostyrene and boron trifluoride was prepared by dissolving 1 cc. of the substituted ethylene in methyl chloride and saturating the solution with boron fluoride. The solution became dark brown and produced a brown viscous oil as a residue on evaporation to dryness at 50° C. This complex was readily soluble in methyl chloride and polymerized styrene and isoprene readily but gave very low molecular weight oils with isobutylene.

Thus the invention polymerizes an unsaturated material at temperatures between +10 and −164° C. by the application to the cold unsaturated material of a Friedel-Crafts complex with a substituted ethylene as catalyst to yield a more or less solid polymer.

While there are above disclosed but a limited number of embodiments of the process and catalyst of the invention, it is possible to produce still other embodiments without departing from the inventive concept herein-disclosed and it is therefore desired that only such limitations be imposed on the appended claims as are stated therein or required by the prior art.

The invention claimed is:

1. In combination with a process for the production of a solid polymer, the improvement which comprises cooling an isobutylene feed to a temperature between 10° C. and −164° C., simultaneously and separately mixing a Friedel-Crafts active metal halide with $\frac{1}{10}$ to 10 moles of a complex-forming substituted ethylene selected from the group consisting of vinyl chloride, allyl chloride, 1-methyl-1-phenyl-2-chloro-ethylene, methallyl chloride, vinylidene chloride, trichloroethylene, tetrachloroethylene, styrene, trimethyl ethylene, tetramethyl ethylene, 1,1-diphenyl ethylene, and triphenyl ethylene per mole of the Friedel-Crafts metal halide to form a liquid catalyst complex, and adding the resulting liquid catalyst complex to the cooled isobutylene feed to produce a solid polymer.

2. In combination with a process for the production of a solid polymer, the improvement which comprises cooling an isobutylene feed to a temperature between −35° C. and −164° C., simultaneously and separately mixing a liquid solution of aluminum chloride in an alkyl chloride of 1 to 2 carbon atoms with $\frac{1}{10}$ to 10 moles of styrene per mole of aluminum chloride to form a liquid catalyst complex, and adding the resulting liquid catalyst complex to the cooled isobutylene feed to produce a solid polymer.

3. In combination with a process for the production of a solid polymer, the improvement which comprises cooling a polymerizable mixture of a major proportion of isobutylene and a minor proportion of isoprene to a temperature between $-40°$ C. and $-164°$ C., simultaneously and separately mixing a liquid solution of aluminum chloride in an alkyl chloride of 1 to 2 carbon atoms with $\frac{1}{10}$ to 10 moles of styrene per mole of aluminum chloride to form a liquid catalyst complex, and adding the resulting complex to the polymerizable mixture to produce a solid polymer.

4. In combination with a process for the production of a solid rubber-like polymer, the improvement which comprises cooling a polymerizable mixture of 92 to 97 parts by weight of isobutylene, 8 to 3 parts by weight of isoprene and 3 volumes of methyl chloride per volume of unsaturated monomers to a temperature of about $-102°$ C., simultaneously and separately mixing a liquid solution consisting of about 0.2 parts by weight of aluminum chloride per 100 cc. of methyl chloride with 1 to 5 moles of ethylene having 1 to 2 phenyl substituents per mole of dissolved aluminum chloride to form a liquid catalyst complex, and spraying the resulting catalyst complex into the precooled polymerizable mixture at a rate equal to 25 to 30 cc. per minute per 220 grams of isobutylene in the feed.

5. A process according to claim 1 wherein the substituted ethylene is vinyl chloride and wherein the polymerization temperature is between $-40°$ C. and $-164°$ C.

6. A process according to claim 1 wherein the substituted ethylene is allyl chloride.

7. A process according to claim 1 wherein the substituted ethylene is diphenyl ethylene.

8. A process according to claim 1 wherein the substituted ethylene is vinylidene chloride.

9. A process according to claim 1 in which the isobutylene feed consists essentially of a major proportion of isobutylene and a minor proportion of a diolefin having 4 to 6 carbon atoms.

RALPH W. DORNTE.

REFERENCES CITED

The following references are of record in the file of this patent:

UNITED STATES PATENTS

| Number | Name | Date |
|---|---|---|
| 1,971,301 | Haeuber | Aug. 21, 1934 |
| 2,180,345 | Blue | Nov. 21, 1939 |
| 2,185,405 | Flemming et al. | Jan. 2, 1940 |
| 2,204,673 | Fulton et al. | June 18, 1940 |
| 2,213,423 | Wiezevich | Sept. 3, 1940 |
| 2,263,654 | Sparks | Nov. 25, 1941 |
| 2,387,543 | Thomas et al. | Oct. 23, 1945 |
| 2,400,129 | Nelson et al. | May 14, 1946 |
| 2,436,614 | Sparks et al. | Feb. 24, 1948 |
| 2,438,340 | Johnson | Mar. 23, 1948 |
| 2,479,450 | Young | Aug. 16, 1949 |

OTHER REFERENCES

Gwyn Williams: Kinetics of the Catalyzed Polymerization of Styrene, Journal Chem-Soc., June 1940, pages 777 and 781.